US011674348B2

United States Patent
Krieger et al.

(10) Patent No.: US 11,674,348 B2
(45) Date of Patent: Jun. 13, 2023

(54) CABLE DRIVE DEVICE OF A MOTOR VEHICLE, WINDOW LIFTER AND CABLE DRUM

(71) Applicant: Brose Fahrzeugteile SE & Co. Kommanditgesellschaft, Bamberg, Bamberg (DE)

(72) Inventors: Thomas Krieger, Breitenguessbach (DE); Lubos Licko, Nitrianske Pravnov (SK); Udo Taubmann, Bad Rodach-Suelzfeld (DE); Michael Wendrich, Coburg (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 17/552,357

(22) Filed: Dec. 16, 2021

(65) Prior Publication Data
US 2022/0186544 A1 Jun. 16, 2022

(30) Foreign Application Priority Data
Dec. 16, 2020 (DE) ...................... 10 2020 216 070.8

(51) Int. Cl.
*E05F 11/48* (2006.01)
*E05F 15/689* (2015.01)

(52) U.S. Cl.
CPC ......... *E05F 15/689* (2015.01); *E05Y 2201/64* (2013.01); *E05Y 2201/654* (2013.01);
(Continued)

(58) Field of Classification Search
CPC ........... E05Y 2201/64; E05Y 2201/654; E05Y 2201/664; E05Y 2201/684; E05Y 2201/66;
(Continued)

(56) References Cited

U.S. PATENT DOCUMENTS

| 5,335,883 A * | 8/1994 | Mawer ...................... E06B 9/60 242/903 |
| 8,176,679 B2 * | 5/2012 | Klippert ................ E05F 11/483 49/352 |

(Continued)

FOREIGN PATENT DOCUMENTS

| DE | 19706870 A1 * | 8/1998 | ............. B60J 7/057 |
| DE | 202005008888 U1 | 10/2006 | |

(Continued)

*Primary Examiner* — Jerry E Redman
(74) *Attorney, Agent, or Firm* — Laurence A. Greenberg; Werner H. Stemer; Ralph E. Locher

(57) ABSTRACT

A cable drive device of an adjustment system of a motor vehicle has an actuating drive and a cable drive housing in which a cable drum that is rotatably coupled to the actuating drive and has a traction cable wound thereon is received. The cable drum, for receiving a cable nipple fastened to the traction cable, on at least one end side has a nipple chamber having a chamber opening and mutually spaced apart chamber walls. The nipple chamber on at least one of the chamber walls has a delimiting element. The cable nipple when introduced into the nipple chamber by way of the chamber opening engaging below the delimiting element.

14 Claims, 9 Drawing Sheets

(52) U.S. Cl.
CPC ... *E05Y 2201/664* (2013.01); *E05Y 2201/684* (2013.01); *E05Y 2900/55* (2013.01)

(58) Field of Classification Search
CPC ......... E05Y 2201/668; E05Y 2201/672; E05Y 2600/528; E05Y 2800/342; E05Y 2800/344; E05Y 2900/55; E05Y 2600/63; E05F 11/483; E05F 11/485; E05F 15/689; E05F 11/486
USPC .......................................................... 49/352
See application file for complete search history.

(56) References Cited

U.S. PATENT DOCUMENTS

| | | | |
|---|---|---|---|
| 10,626,962 B2 | 4/2020 | Muramatsu et al. | |
| 2005/0241236 A1* | 11/2005 | Smith | E05D 13/1276 74/89.22 |
| 2006/0059781 A1* | 3/2006 | Berklich | E05F 15/689 49/352 |
| 2009/0314869 A1* | 12/2009 | Savard | E05D 13/1261 49/70 |
| 2011/0016793 A1* | 1/2011 | Gallois | E05F 11/488 49/352 |
| 2013/0133265 A1* | 5/2013 | Seo | E05F 15/689 49/352 |
| 2013/0227889 A1* | 9/2013 | Matsushita | E05F 11/483 49/352 |
| 2016/0047411 A1* | 2/2016 | Simonneau | E05F 15/695 74/502.5 |
| 2016/0208536 A1* | 7/2016 | Gipson | E05D 15/0621 |
| 2021/0003156 A1* | 1/2021 | Arimoto | E05F 11/488 |
| 2022/0186544 A1* | 6/2022 | Krieger | E05F 15/689 |

FOREIGN PATENT DOCUMENTS

| | | | | |
|---|---|---|---|---|
| DE | 202006001054 U1 | 5/2007 | | |
| DE | 102008031467 A1 | * 1/2010 | ............ | E05F 11/483 |
| DE | 102020213193 A1 | * 4/2022 | | |
| JP | 2002036871 A | * 2/2002 | | |
| KR | 101991780 B1 | 6/2019 | | |

\* cited by examiner

CABLE DRIVE DEVICE OF A MOTOR VEHICLE, WINDOW LIFTER AND CABLE DRUM

CROSS-REFERENCE TO RELATED APPLICATION

This application claims the priority, under 35 U.S.C. § 119, of German Patent Application DE 10 2020 216 070.8, filed Dec. 16, 2020; the prior application is herewith incorporated by reference in its entirety.

FIELD AND BACKGROUND OF THE INVENTION

The invention relates to a cable drive device of an adjustment system, in particular of a window lifter or of a window lifter module, of a motor vehicle, having an actuating drive and a cable drive housing as well as a cable drum which is received in the cable drive housing so as to be rotatable about a rotation axis and on which a traction cable is wound, or able to be wound. The invention furthermore relates to a window lifter (a window lifter module) as an adjustment system having such a cable drive device as well as to a cable drum for a cable drive device of this type.

Movable vehicle window glass is typically repositioned between a closed position and an open position by electrically operated or electric-motor-operated actuating devices or cable drive devices of a vehicle window lifter. Such a window lifter comprises an (electric) actuating motor as the cable drive or actuating drive, as well as an actuating mechanism that connects the actuating drive and the window glass, i.e. couples the actuating drive and the window glass in a force-transmitting manner, and is assigned to a motor vehicle door or a motor vehicle body. To this end, an entrainment element or a rail slider which has an entrainment function and is guided so as to be displaceable on a guide rail is mechanically linked to the window glass to be moved.

A flexible traction means, for example in the form of a Bowden cable (a Bowden sheath with an inner cable) or in the form of a sheathless traction cable (without a Bowden cable) which is connected to the cable drive or actuating drive and driven by the latter is typically provided for moving the respective rail slider along the guide rail and the window glass along the adjustment path between the closed position and the open position.

Deflection elements, for example deflection rollers, of the window lifter are provided for guiding the traction cable along the guide rail, the deflection elements like the respective guide rail and the cable drive or actuating drive being disposed on a door module, also referred to as an apparatus support, in the form of an inner door plate, or being fastened to the latter, respectively. Window lifters having cable pull mechanisms of this type are also referred to as cable pull window lifters.

The cable drive device of the window lifter typically contains a cable drum which is rotationally driven by the cable drive or actuating drive and is wrapped by the traction cable and to this end has a helical or spiral cable channel (cable groove), the traction cable as a cable loop, typically having a plurality of windings that are axially spaced apart, lying in the cable channel. As a consequence of a rotating movement of the cable drum, the traction cable by way of a cable portion (cable end) is wound onto the cable drum and by way of the other cable portion (cable end) is unwound from the cable drum. As a result, the cable loop formed by the traction cable is displaced, this in turn leading to a movement of the rail slider along the guide rail and thus to an adjustment of the window glass between the closed position and the open position.

In a drive installation for a cable window lifter known from German utility model DE 20 2006 001 054 U1 and having a self-acting cable length compensation mechanism and a traction cable that in a closed cable loop is guided by way of deflection rollers and driven by a cable drum, the cable loop ends of the traction cable are hooked into nipple chambers (cable nipple chambers). The spiral cable channel, by way of an incoming or outgoing channel end (end-side groove portion), respectively, opens into the nipple chambers that are situated in a radially external lateral region or drum region on the opposite end sides of the cylindrical cable drum.

When assembling the traction cable at or on the cable drum, one of the cable ends or cable loop ends that is provided with a cable nipple is first placed into one of the nipple chambers. Assembly errors can arise here in that the cable nipple placed into the nipple chamber slides out of the nipple chamber, in particular when the cable nipple has not yet been guided into the nominal position of the latter in the nipple chamber. Such a situation in the course of the cable assembly arises in particular when the nipple chamber is larger than the length of the cable nipple in the cable longitudinal direction. It is not least for this reason that inserting the cable nipple into the nipple chamber on the drum in an automated manner has proven difficult to date.

SUMMARY OF THE INVENTION

The invention is based on the object of specifying a suitable cable drive device in which a reliable assembly of the traction cable at or on the cable drum, and in particular reliable inserting of the cable nipple into the respective nipple chamber of the cable drum, is made possible. Assembly errors when inserting (placing) the cable nipple of the traction cable into the corresponding nipple chamber of the cable drum are to be avoided in particular. A particularly suitable cable drum for such a cable drive device is furthermore to be specified. Moreover to be specified is a window lifter (a window lifter module) having a cable drive device of this type.

According to the invention, this object in terms of the cable drive device is achieved by the features of the independent cable drive device claim, and in terms of the window lifter as a preferred adjustment installation of a motor vehicle by the features of the independent motor vehicle claim, and in terms of the cable drum by the features of the independent cable drum claim. Advantageous design embodiments and refinements are the subject matter of the dependent claims.

The cable drive device has a, preferably electric-motor-operated, cable drive or actuating drive and a cable drive housing in which a cable drum which is coupled, or able to be coupled, to the actuating drive and rotatable about a rotation axis and onto which a traction cable is wound, or able to be wound, is received.

The actuating drive suitably has an electric motor, for example a brush motor, which is preferably operated fully connected to a reduction gearbox. This expediently is a worm gear mechanism having a worm which is rotationally fixed to the motor shaft and meshes with a worm gear that is connected or coupled to a pivot which is joined, preferably in a form-fitting manner, to the cable drum. To this end, the cable drum preferably has a central receptacle opening having a joining contour, in particular an internal toothing, for establishing a suitably form-fitting joint with a mating contour, in particular an external toothing, of the pivot of the actuating drive, or the worm gear (gear wheel) of the latter, respectively.

The cable drum is wrapped, or able to be wrapped, by a traction cable, in particular while forming an incoming and an outgoing cable portion (cable end). To this end, the preferably cylindrical cable drum has a drum casing having a helical or spiral cable groove for receiving the traction cable, or a cable loop of the traction cable, respectively. In the assembled state, the traction cable is wound on the cable drum and herein lies in the cable groove on the casing. The cable drum on at least one end side or circular face on the end side of the cable drum has a nipple chamber which by way of an end-side groove portion, hereunder also referred to as the (incoming) channel end, transitions into the circumferential cable groove of the cable drum, or into which such a channel end of the cable groove opens, respectively.

The nipple chamber serves for receiving a cable nipple that is disposed, in particular fastened in a clamped manner, on the end side of the traction cable. A drum-proximal rear-engagement contour, in particular in the manner of an undercut, is preferably provided at the transition of the cable groove, or of the channel end, respectively, to the nipple chamber, the cable nipple in the assembled state by way of a nipple portion engaging below or behind the rear-engagement contour, respectively. As a result, the cable nipple is securely fixed and also held in a reliable and captive manner in the nipple chamber, in particular by virtue of the tensile forces that act in or on, respectively, the traction cable in the assembled state.

A "cable nipple" is understood to be a sleeve or cap that is placed onto the traction cable, preferably on the cable end thereof, and press-fitted thereto. The cable nipple can be cylindrical, round or teardrop-shaped. However, the cable nipple is preferably embodied so as to be hex-shaped or hexagonal, in particular having at least one face pairing of mutually parallel nipple faces.

The nipple chamber has an in particular substantially rectangular chamber opening as well as chamber walls that are mutually spaced apart in the radial direction—thus in the radial direction in terms of the rotation axis of the cable drum. Proceeding from the chamber opening on the corresponding drum end side, the chamber walls extend axially into the drum body—thus in the axial direction in terms of the rotation axis of the cable drum. The chamber walls preferably extend or run tangentially, wherein the tangential length or extent of the chamber walls is suitably 15% to 25%, preferably (20±2.5)% of the diameter of the cable drum.

The nipple chamber on at least one of the chamber walls thereof has a delimiting element, the cable nipple when introduced into the nipple chamber by way of the chamber opening engaging below the delimiting element. In an advantageous design embodiment the delimiting element is oval or teardrop-shaped, wherein this shape of the delimiting element in the axial direction tapers toward the drum end side opposite the chamber opening. The delimiting element is expediently embodied as a rib that extends radially into the nipple chamber and along a delimited axial portion of the chamber wall. At least one delimiting element which is preferably radially raised on the chamber wall is particularly advantageously provided on each of the two chamber walls of the nipple chamber. The at least two delimiting elements on the chamber in the radial direction are advantageously disposed so as to be diametrically opposite one another, thus being situated along the same radius.

The available width between the chamber walls in the region of the delimiting element, or between the delimiting elements, respectively, is expediently smaller than the diameter or than the spacing between opposite nipple faces of the cable nipple, the latter preferably being hexagonal in cross section. The (respective) delimiting element suitably constricts the available width of the nipple chamber between the chamber walls of the latter at the location of the delimiting element, in particular on the radially oriented apex of the latter, or at the radial maximum, respectively, by 3% to 8%, preferably by (5±1.5)%.

The delimiting element in the region of the chamber opening, in the tangential direction, or in the circumferential direction of the cable drum, respectively, particularly preferably subdivides the nipple chamber into two chamber regions of which the tangential length—thus the extent of the latter in the tangential direction in terms of the rotation axis of the cable drum—is smaller than the length of the cable nipple in the longitudinal direction of the cable, or of the nipple, respectively.

In the course of the assembly of the traction cable, the cable nipple on or at the cable drum is introduced into the assigned nipple chamber from the drum end side assigned to the latter, and in an assembly step is guided in the axial direction below the or each delimiting element. The cable nipple, by way of its nipple end side that faces away from the traction cable, thus the side with the free end, here can be inserted into a chamber region that in the circumferential or tangential direction, respectively, is situated in front of or behind the delimiting element. The tangential length, or the extent of the cable nipple in the tangential direction in terms of the rotation axis of the cable drum, respectively, is therefore preferably of identical size or only slightly larger than the diameter of the envelope of the cable nipple, or than the spacing between two parallel nipple faces of the cable nipple.

The cable nipple is subsequently tilted such that the nipple longitudinal axis thereof is transferred from the position parallel to the drum rotation axis to a position that is inclined in relation to the latter. The cable nipple in this tilted, inclined or angular position is guided below the delimiting element and subsequently to the nominal position. The cable nipple can also be inserted into the nipple chamber with the nipple longitudinal axis running transversely to the drum rotation axis, in that the cable nipple is press-fitted by way of the respective delimiting element, in other words the latter having the cable nipple pushed axially over in the manner of a latching or snap-fitting action. It is advantageous in particular with a view to this variant of assembly for the delimiting element to be radiused, in particular to have a radiused surface.

According to one advantageous refinement, the traction cable at both ends by way of one cable nipple thereon is guided in each case into one nipple chamber. To this end, the cable drum in an advantageous refinement on both end sides (drum end sides or circular faces on the end sides) has in each case one nipple chamber. In other words, the cable drum in an advantageous refinement on the second end side (second circular face on the end side), opposite the first end side (first circular face on the end side), has an accessible second nipple chamber for receiving a cable nipple of a further traction cable or a second cable nipple fastened to the second cable end of the traction cable. The second nipple chamber here in turn, by way of a second groove portion on the end side, or an (outgoing) channel end, transitions to the circumferential cable groove of the cable drum. The groove portions or channel ends on the end sides that open into the nipple chambers preferably run in opposite circumferential directions of the cable drum and in a radially external end-side region of the cable drum.

During the assembly of the traction cable, the cable nipple of the latter that is preferably on the incoming cable end first is inserted into the assigned nipple chamber, preferably on the end side of the cable drum that faces the cable drive. The cable nipple at the other (outgoing) cable end can also first be inserted into the assigned nipple chamber. It is avoided here by virtue of the delimiting element, or the two or the plurality of delimiting elements, that the cable nipple slides out of the nipple chamber.

Once the cable nipple has been guided into the nominal position thereof in the nipple chamber, the traction cable, by way of a number of axially spaced apart windings, while forming the incoming cable portion and the outgoing cable portion that is axially spaced apart from the latter, is placed into the cable groove on the casing or the circumference of the cable drum. Once the traction cable has been guided over the deflection elements or deflection rollers and been connected to the or each rail slider, the second cable nipple at the remaining cable end is inserted into the second nipple chamber. In the case of two traction cables, the latter are wound onto the cable drum, and the cable drive housing is subsequently assembled (snap-fitted), wherein the traction cables are installed over the deflection elements or deflection rollers, respectively, and connected to or at the rail sliders as the assembly of the window lifter progresses. The second nipple chamber advantageously likewise has at least one such delimiting element for positioning or securing the position, respectively, of the cable nipple at that location when the cable nipple is introduced (inserted) into the nipple chamber.

A window lifter module (window lifter system), hereunder also referred to simply as a window lifter, as a preferred adjustment system for a motor vehicle has at least one guide rail and a cable drive device according to the invention. In the case of a single-wire window lifter, a rail slider having an entrainment function for a window glass is guided so as to be movable on the—in this instance—single guide rail. The cable drive device is also suitable for a dual-wire window lifter having two parallel guide rails on which in this instance one rail slider connected to the traction cable is in each case guided so as to be able to slide on the guide rail.

Other features which are considered as characteristic for the invention are set forth in the appended claims.

Although the invention is illustrated and described herein as embodied in a cable drive device of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually corresponding parts and variables are provided with the same reference signs in all figures.

Figure 1:
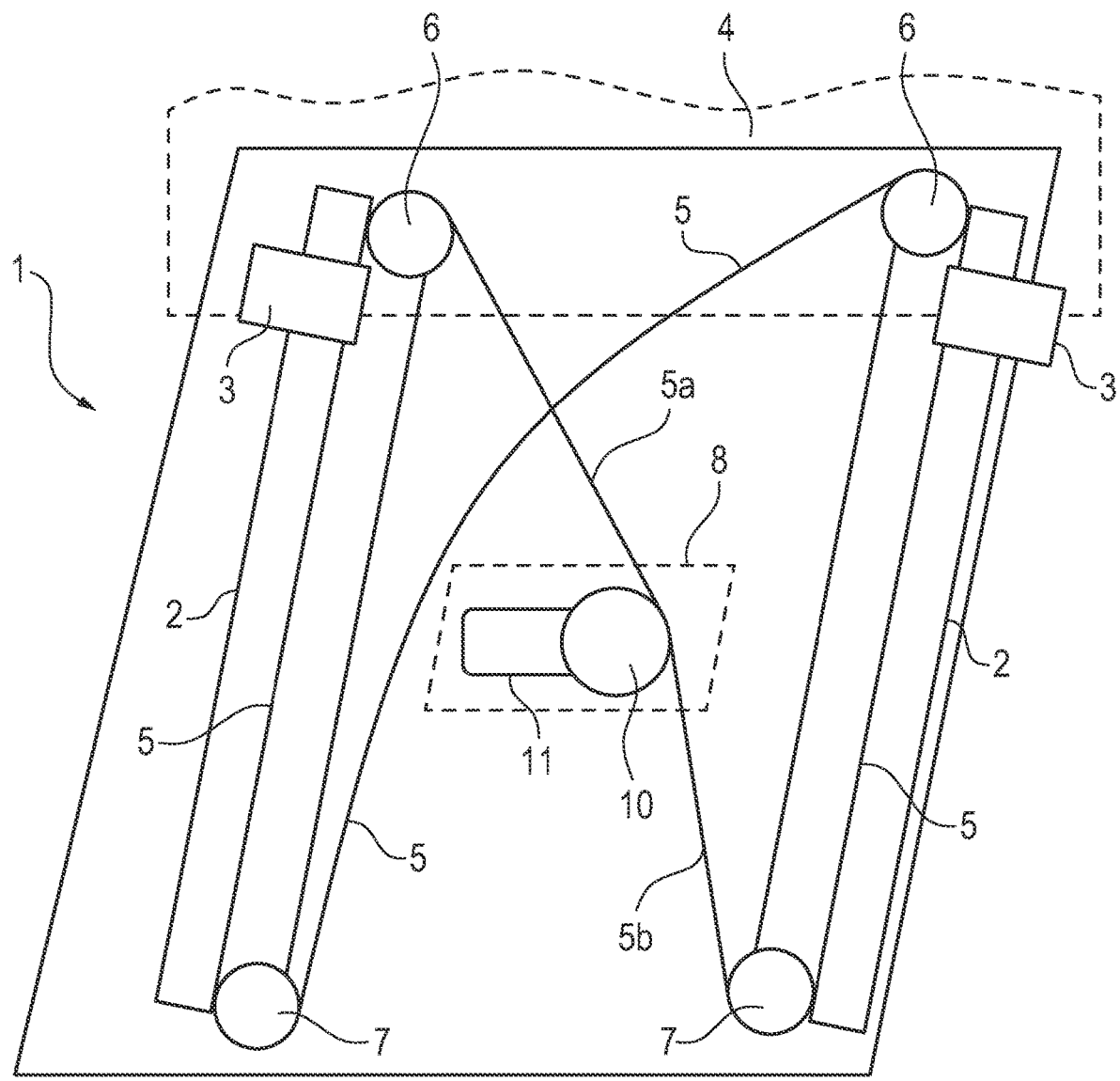
FIG. 1 is a schematic illustration showing a window lifter (window lifter module, vehicle window lifter) having a cable drive device and having two guide rails, with rail sliders having an entrainment function for a (vehicle) window glass that are guided on the guide rails and connected to the cable drive device.

Referring now to the figures of the drawings in detail and first, particularly to FIG. 1 thereof, there is shown a window lifter 1 as an adjustment system for a motor vehicle, in the exemplary embodiment a so-called dual-wire cable window lifter, having two parallel guide rails 2 on which rail sliders 3 having an entrainment function for a window glass 4 are guided so as to be able to slide on the guide rails 2. The window glass 4 is held, for example fixed in a clamped manner, on the rail sliders 3. The rail sliders 3 are connected to a traction cable 5 which is guided by way of upper and lower deflection elements 6 and 7, respectively, preferably in the form of deflection rollers, and coupled to a cable drive device 8. A rotating movement of the preferably electric-motor-operated cable drive device 8 leads to the window glass 4 being repositioned to an open position, or in the opposite direction to a closed position.

Figure 2:
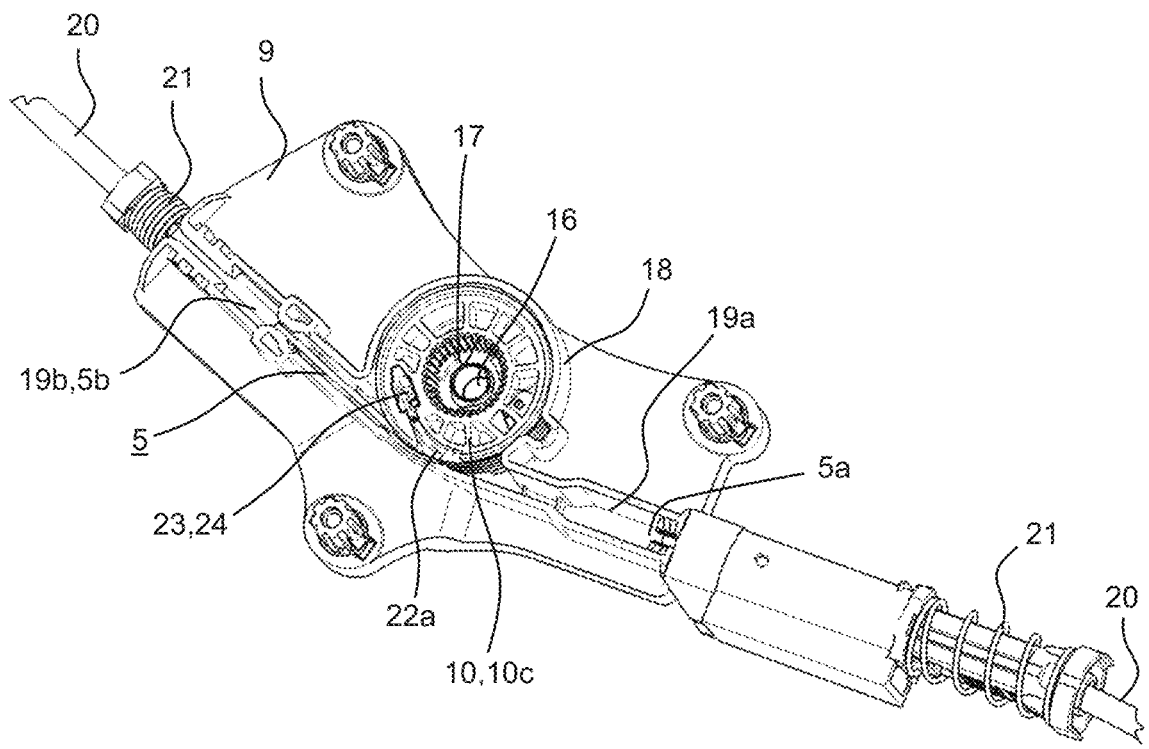
FIG. 2 is a perspective illustration showing a cable drive housing having a cable drum lying therein, with a wound-up traction cable, when viewed toward the drive-proximal end side of the cable drum.
Figure 3:
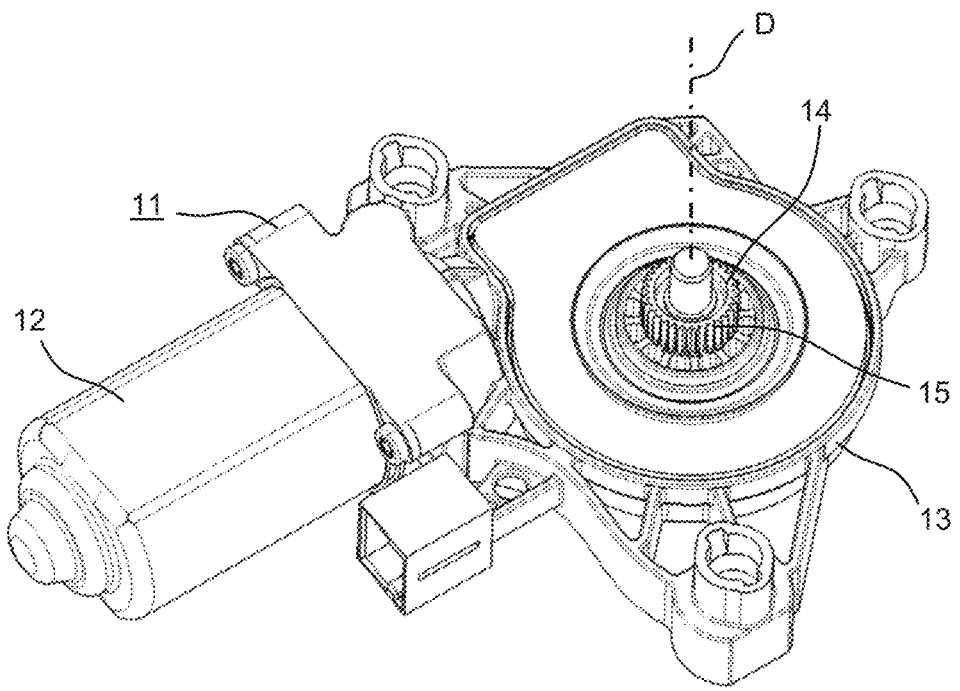
FIG. 3 is a perspective illustration showing the cable drive having an electric motor having a gearbox coupled thereto, and having a gearbox-proximal (output-proximal) pivot for the cable drum.

The cable drive device 8 has a cable drive housing 9 shown in FIG. 2, the cable drive housing 9 having a cable drum 10 received therein and an actuating drive 11 shown in FIG. 3. The actuating drive 11 has an electric motor 12, for example a brush motor, and a worm gear mechanism that is operatively coupled thereto. This worm gear mechanism has a worm gear which is not visible, received in a gearbox housing 13 and meshes with a worm that is likewise not visible and is fixedly held (in a rotationally fixed manner) on a motor shaft of the electric motor 12. The worm gear is coupled or connected to a pivot 14 which, in the exemplary embodiment, in the manner of a gear wheel or a pinion has an external toothing 15.

The pivot 14 in the assembled state of the cable drive device 8 is connected (joined) in a form-fitting manner to the cable drum 10. As can be seen from FIG. 2, the cable drum 10 to this end has a central receptacle opening 16 having an internal toothing 17 for establishing a form-fitting joint with the pivot 14, or the external toothing 15 thereof, respectively, of the actuating drive 11. The cable drum 10 is received or mounted in the cable drive housing 9 so as to be rotatable about a rotation axis D. Directional indications, in particular axial, radial or tangential, or in the axial direction A, in the radial direction R or in the tangential direction T, refer to the rotation axis D.

As can be seen in FIG. 2, the cable drive housing 9 has a housing wall 18 which in portions or in part comprises the cable drum 10 and which tapers or transitions to an incoming and an outgoing cable duct 19a, 19b. The housing wall 18 of the cable drive housing 9 contains the cable drum 10 by way of a preferred circumferential angle of (230±15)°. An annular gap which is formed here between the cable drum 10 and the housing wall 18 is suitably smaller than the diameter of the traction cable 5 so that the latter is secured on the cable drum 10.

The traction cable 5 in the exemplary embodiment is embodied as an inner cable with a flexible traction sheath 20 (Bowden cable embodiment). The traction cable 5, or the inner cable, respectively, by way of a cable loop not referred to in more detail wraps the cable drum 10 by way of a plurality of axially spaced apart cable windings. The traction cable 5, or the cable loop, respectively, has an incoming cable portion (a first cable end) 5a and an outgoing cable portion (a second cable end) 5b which are disposed (installed) in the incoming and in the outgoing cable duct 19a and 19b, respectively. It is ensured by virtue of the suitably dimensioned annular space between the cable drum 10 and the housing wall 18 that the traction cable 5, or the inner cable thereof, respectively, cannot slide out of a circumferential cable channel or cable groove (FIGS. 7, 8, 10 and 12) of the cable drum 10 at any location along the housing wall 18.

The two ends of the traction sheath 20 are supported on the cable drive housing 9, while the traction cable 5 as the inner cable is guided into the cable drive housing 9 and there is guided about the cable drum 10 by way of the plurality of cable windings. The ends of the traction sheath 20 by way of a respective spring element 21 bear in each case on the cable ducts 19a and 19b of the cable drive housing. As a result, the traction cable 5 is pretensioned such that cable slack in the traction cable is compensated for and an automatic cable length compensation of the traction cable 5 is provided. The traction cable 5 is wound onto the cable drum 10 while forming the incoming and outgoing cable portion 5a, 5b. The incoming cable portion 5a, on the (second) end side 10c of the cable drum 10 that is visible in FIG. 2, continues in a channel end or (first) groove portion 22a which is provided in the radially external region of the cable drum 10 and opens into a first nipple chamber 23 of the cable drum 10. A (first) cable nipple 24a which is fastened to the corresponding cable end of the traction cable 5 is placed and established in this first nipple chamber 23.

Figure 4:
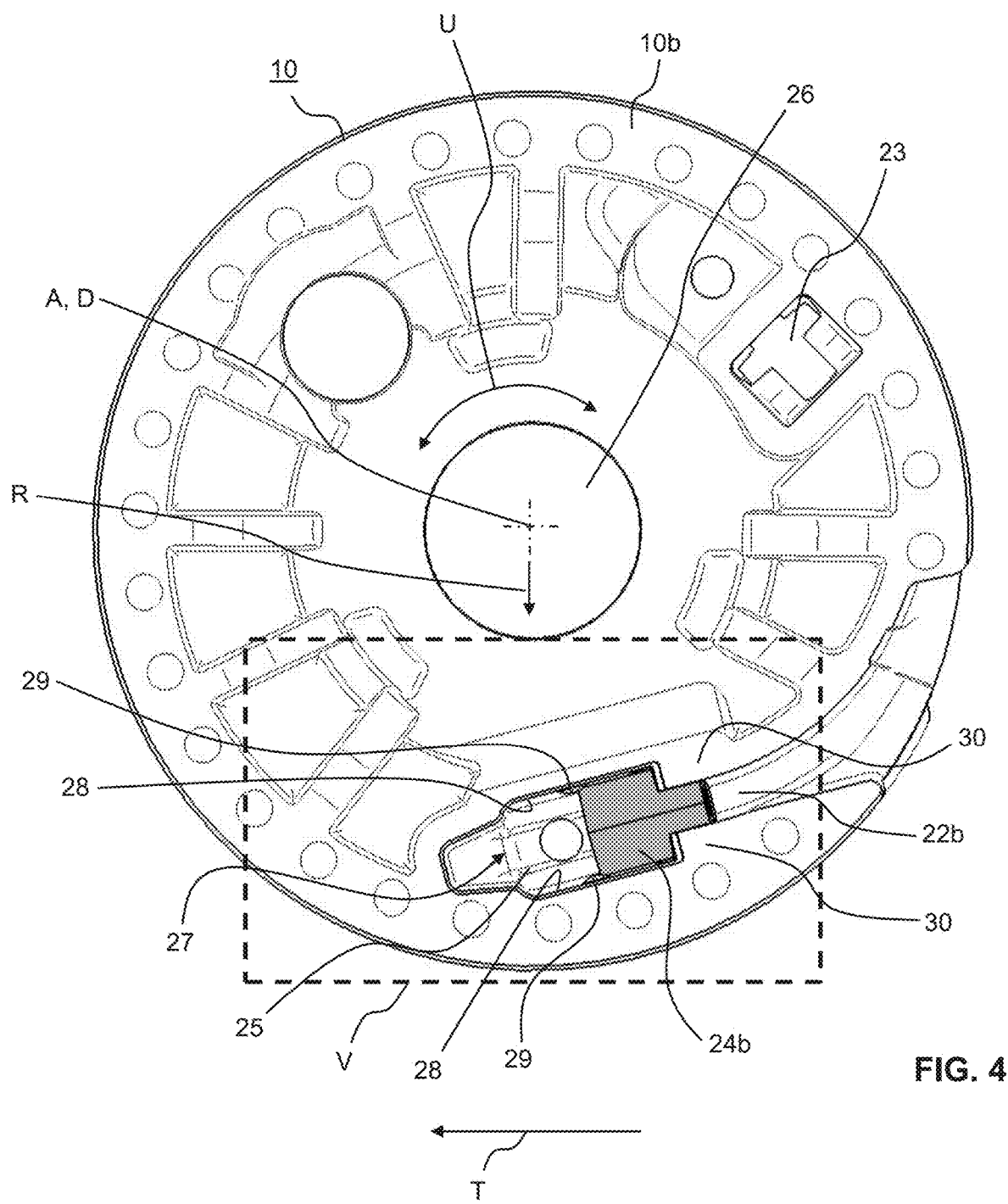
FIG. 4 is a plan view showing the cable drum when viewed toward an end side that lies in the cable drive housing and faces away from the cable drive, with a cable nipple sitting in a nipple chamber.

The outgoing cable portion 5b, on the opposite end side 10b (FIGS. 7 and 8) of the cable drum 10 that is not visible and obscured by the cable drive housing 9 in FIG. 2, likewise continues into a channel end or (second) groove portion 22b which is provided in the radially external region of the cable drum 10 and opens into a second nipple chamber 25 of the cable drum 10 that can be seen and identified in FIG. 4. A second cable nipple which is not referred to in more detail and fastened to the corresponding cable end of the traction cable 5 is placed and established in this second nipple chamber 25.

Figure 7A:
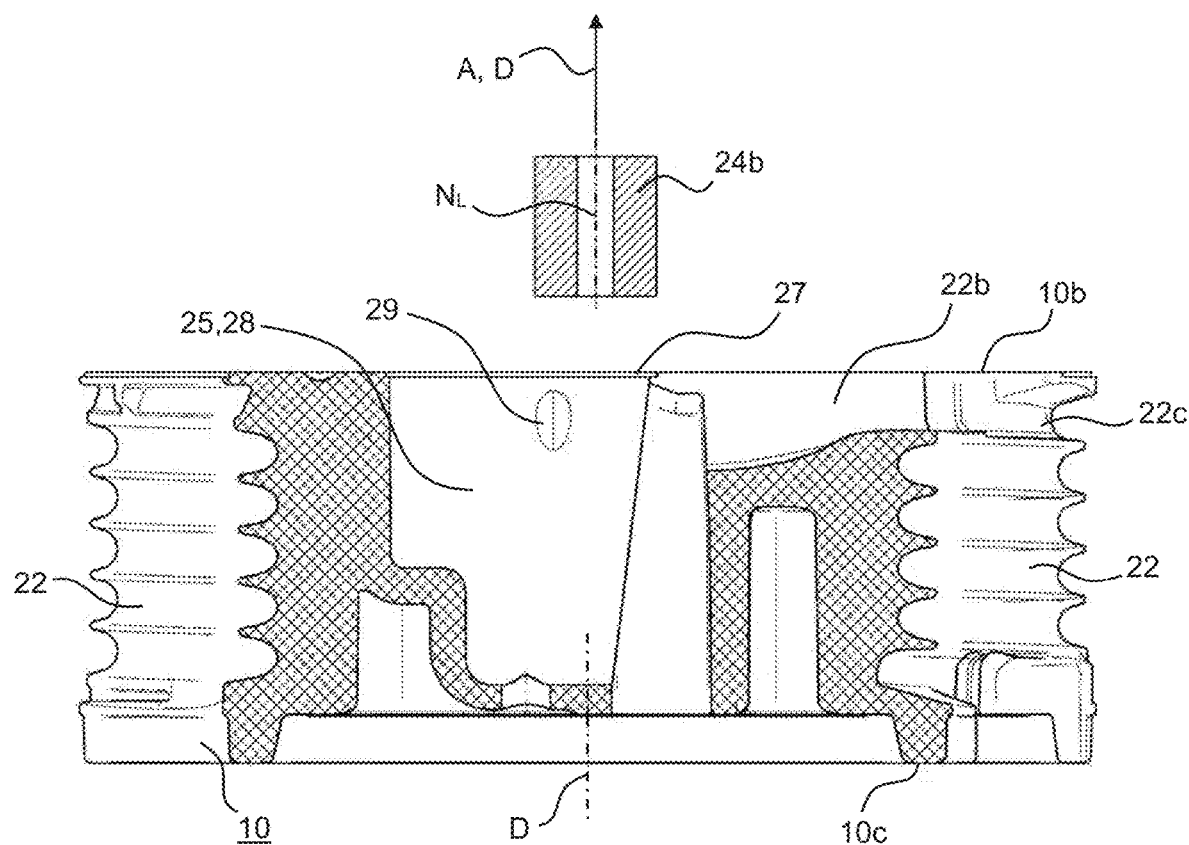
FIGS. 7A and 7B are sectional views showing the cable drum and the cable nipple in the introduction position of the latter according to FIGS. 6A and 6B.
Figure 7B:
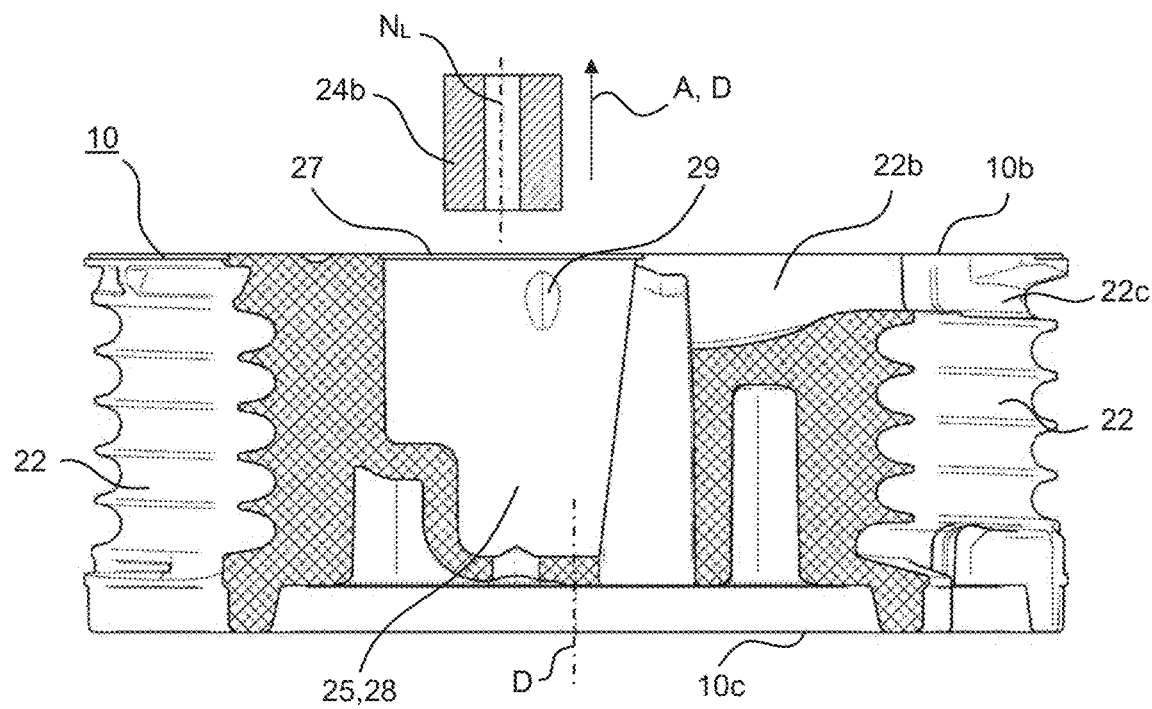
Figure 8:
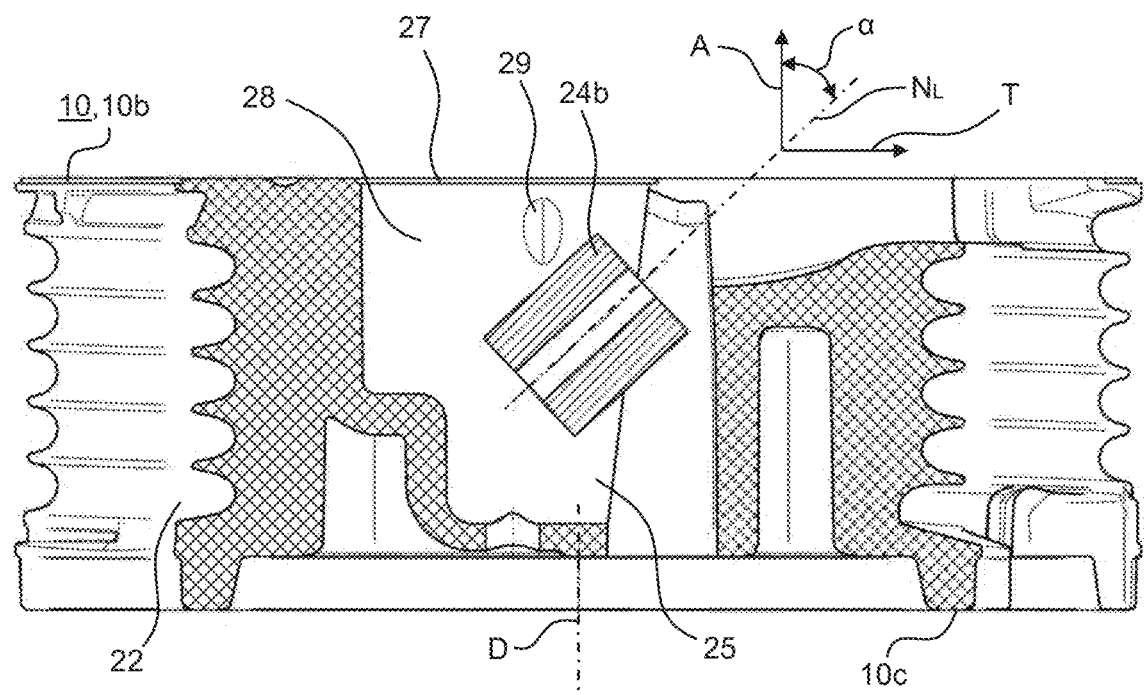
FIG. 8 is a sectional view according to FIGS. 7A and 7B showing the cable drum and the cable nipple in a position axially below the delimiting element on the chamber wall.

As can be seen from FIGS. 7A, 7B and 8, the cable drum 10 has a drum casing 10a having a helical or spiral cable groove 22 for receiving the traction cable 5 or a cable loop of the traction cable 5. As can be seen from FIG. 4, the cable drum 10 on the end sides (drum end sides, circular faces on the end side) 10b, 10c thereof has the respective nipple chamber 23, 25 which by way of the respective groove portion (the respective channel end) 22a, 22b on the end side transitions to the circumferential cable groove 22 of the cable drum 10.

FIGS. 4 to 6B and 9 show the cable drum 10 when viewed toward the first end side 10b thereof which faces away from the cable drive or actuating drive 11 and by way of which the cable drum 10 lies in the cable drive housing 9.

Figure 5:
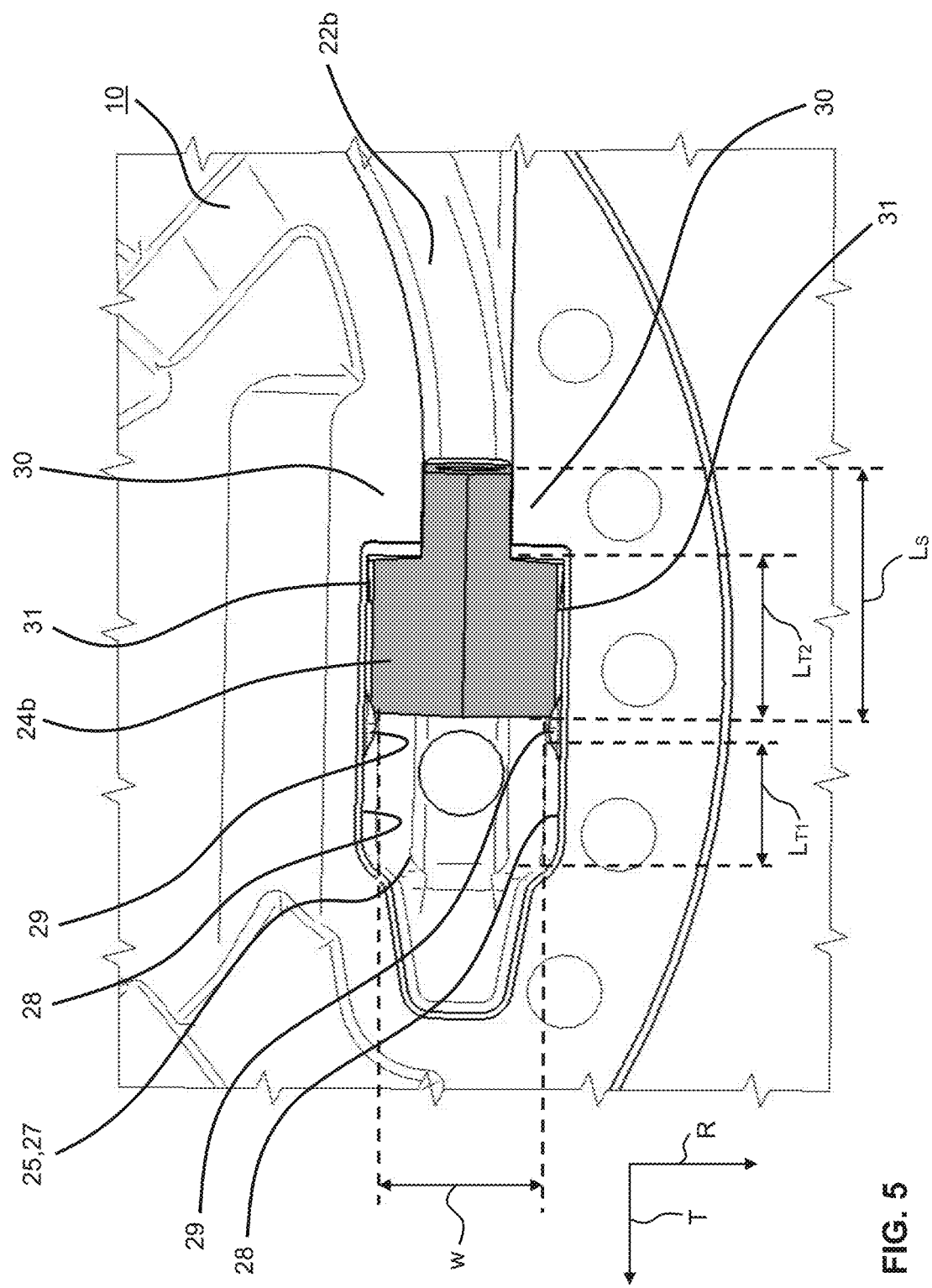
FIG. 5 is an illustration showing a fragment V from FIG. 4 in a larger scale, when viewed toward delimiting elements in the form of radially oriented ribs that are disposed on opposite chamber walls.

As can be seen in a comparatively obvious manner in FIG. 4 and in particular in FIG. 5, the groove portion 22b on the end side, as a channel end, opens from the presently upper groove portion 22c (FIGS. 7A, 7B) of the cable groove 22 into the assigned nipple chamber 25. The nipple chamber 25 serves for receiving and establishing the cable nipple 24b that at the cable end—in the exemplary embodiment of the incoming cable portion 5a—is fastened to the latter, for example press-fitted with or on the latter.

In a central drum opening 26 which penetrates the cable drum 10 in FIG. 4, the rotation axis D of the cable drum 10 that is normal to the drawing plane and the axial direction A that is coaxial therewith are visualized as a chain-dotted cross, and the radial and tangential direction R and T, respectively, in terms thereof, are visualized as arrows.

As can be seen in a comparatively obvious manner in FIG. 5 as an enlarged fragment V from FIG. 4, the nipple chamber 25 has a chamber opening 27 that is accessible from the corresponding drum end side 10b, as well as two chamber walls 28 that are mutually spaced apart in the radial direction R. These two chamber walls 28 run in the tangential direction T and extend in the axial direction A, thus into the drawing plane. A delimiting element 29 in the form of a radial rib is molded on the respective chamber wall 28 of the nipple chamber 25. In other words, the delimiting element 29 in the radial direction R extends into the nipple chamber 25. The delimiting element 29 is thus oriented in the direction of the opposite chamber wall 28.

Figure 9:
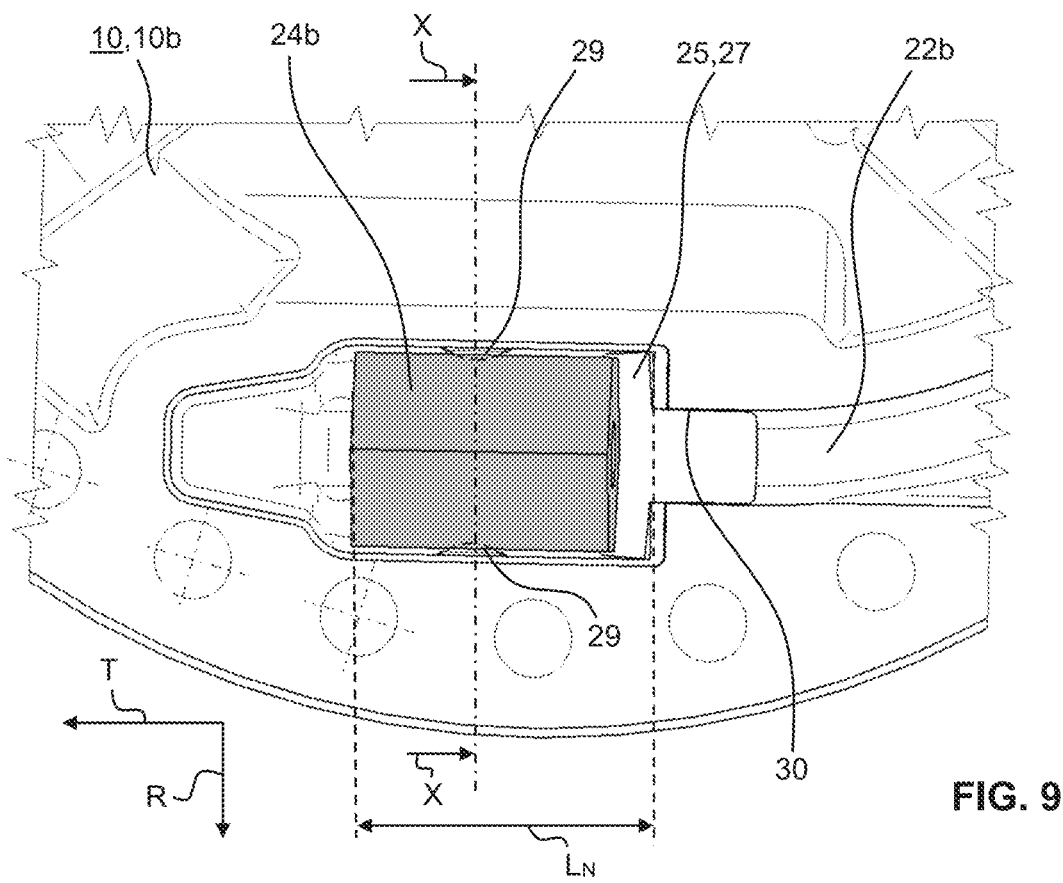
FIG. 9 is an illustration of a fragment according to FIGS. 5 and 6 showing the cable nipple when introduced into the nipple chamber by being pushed (axially) over the or each delimiting element.

As can be seen, this nipple chamber 25 opens tangentially, or in the circumferential direction U (FIG. 4), into the groove portion at this location, or in the groove end 22b of the cable groove 22 at this location, respectively, as can be seen in a comparatively obvious manner in FIG. 9. As can likewise be seen, the cable nipple 24b in the assembled position shown is guided below a rear-engagement contour 30. This rear-engagement contour 30 is situated at the transition of the nipple chamber 25 to the groove portion 22b of the cable groove 22. As a result, the cable nipple 24b is held axially in a form-fitting manner in the nominal position or orientation thereof in the nipple chamber 25.

As is visualized in conjunction with FIG. 9, the tangential length (chamber length) or extent $L_N$ of the nipple chamber 25—without the rear-engagement contour 30—is preferably (20±2.5)% of the diameter of the cable drum 10. The available width w between the chamber walls in the region of the delimiting elements 29 is smaller than the spacing between opposite nipple faces 31 of the preferably hex-shaped (hexagonal in the cross section) cable nipple 24b, the hexagonal cross section of the latter being identifiable in FIGS. 6A and 6B.

The respective delimiting element 29 constricts the spacing, or available width of the nipple chamber 25, respectively, between the chamber walls 28 of the latter at the location of the delimiting element 29, in particular on the radially oriented apex, or at the radial maximum, respectively, of the delimiting element 29 by 3% to 8%, preferably by (5±1.5)%. In the two delimiting elements 29 which in the exemplary embodiment are diametrically opposite one another the available width w of the nipple chamber 25 between the chamber walls 28 of the latter at the location of the delimiting elements 29 is preferably constricted in total by approximately 4% to 10%, in particular by 6% to 8%, in comparison to the wall regions without a delimiting element.

The respective delimiting element 29 in the region of the chamber opening 27 in the tangential direction T, or in the circumferential direction U of the cable drum 10, respectively, subdivides the nipple chamber 25 into two chamber regions of which the tangential length $L_{T1}$ for the chamber region that in FIG. 5 is on the left and faces away from the groove portion 22b and the tangential length $L_{T2}$ for the chamber region that in FIG. 5 is on the right and faces the groove portion 22b are smaller than the length (nipple length) $L_S$ of the cable nipple 24b in the longitudinal direction of the cable or the nipple, respectively, the latter here corresponding to the tangential direction T.

Figure 6A:
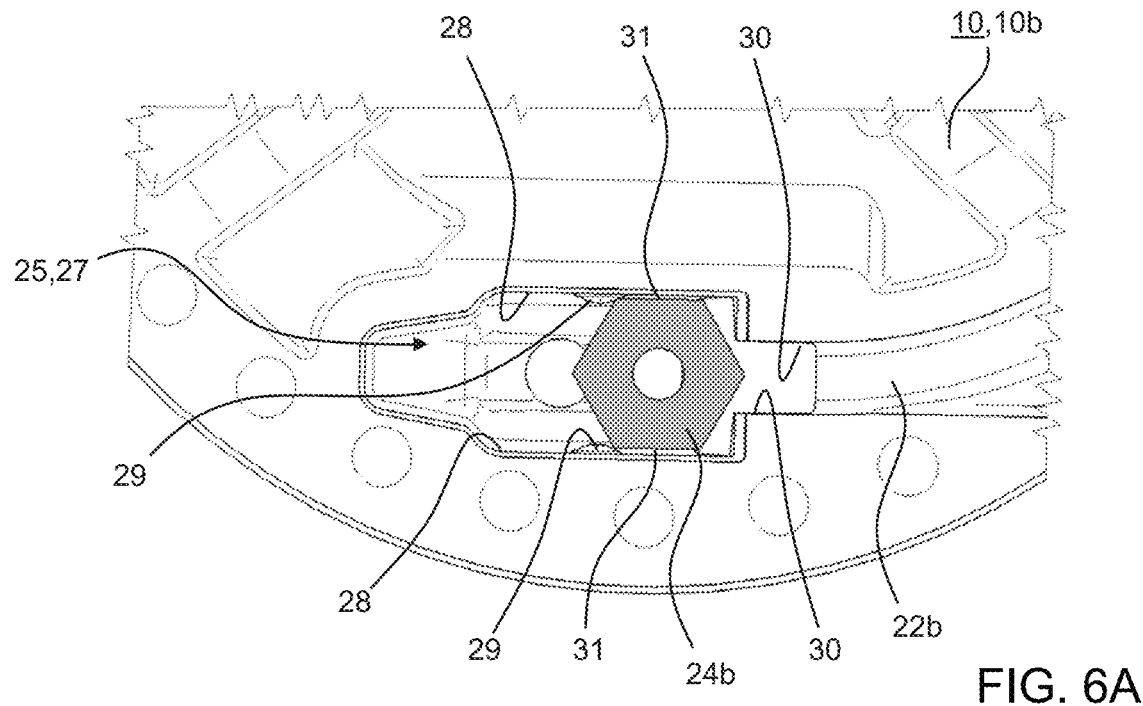
FIGS. 6A and 6B are illustrations showing a fragment according to FIG. 5 and show the cable nipple when introduced into a chamber region in front of or behind, respectively, the delimiting elements of the nipple chamber of the cable drum.
Figure 6B:
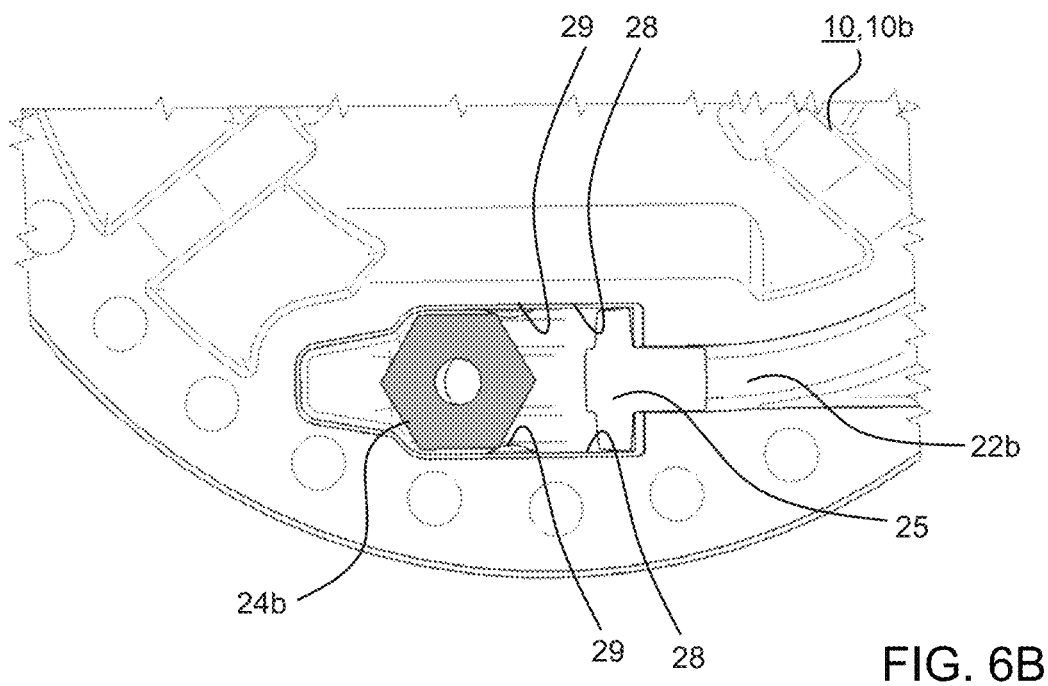

FIGS. 6A and 6B as well as 7A and 7B show two variants or possibilities, respectively, of inserting the cable nipple 24b into the nipple chamber 25. In the course of the assembly of the traction cable 5 on or at the cable drum 10, the cable nipple 24b is guided into the assigned nipple chamber 25 from the drum end side 10b assigned to the nipple chamber 25. This takes place in such a manner that the cable nipple 24b—as is illustrated—by way of the end (free nipple end) thereof that faces away from the traction cable 5, and by way of the end side at that location leading, is inserted into the right chamber region (FIG. 6A, 7A) or into the left chamber region (FIG. 6B, 7B) of the nipple chamber 25. The cable nipple 24b in the axial direction A here is guided into the nipple chamber 25 to below the respective delimiting element 29, and subsequently tilted or pivoted from the axial position in the direction of a tangential position.

FIG. 8 shows this assembly step of the cable nipple 24b when inclining or pivoting the latter from the axial position, having the nipple longitudinal axis $N_L$ parallel to the axial direction A, to a position parallel to the tangential direction T, or to an angular orientation or angular position between the axial direction A and the tangential direction T, for example by way of or at an angle α of approximately 45° in relation to the axial direction A. The cable nipple 24b in this situation is situated within the nipple chamber 25 and therein axially below the delimiting element 29. The cable nipple 24b herein or subsequently is guided past the delimiting element 29 in the direction of the groove portion (channel end) 22b of the cable groove 22 so as to at this location engage below the rear-engagement contour 30.

As can be seen in a comparatively obvious manner from FIG. 8, the (respective) delimiting element 29 is oval or teardrop-shaped. The delimiting element 29 in the axial direction A tapers toward the drum end side 10c opposite the chamber opening 27. The delimiting element 29 is embodied as a rib that extends radially into the nipple chamber 25 and along a delimited axial portion of the chamber wall 28. The delimiting element 29 is preferably molded from the respective chamber wall 28.

Figure 10:
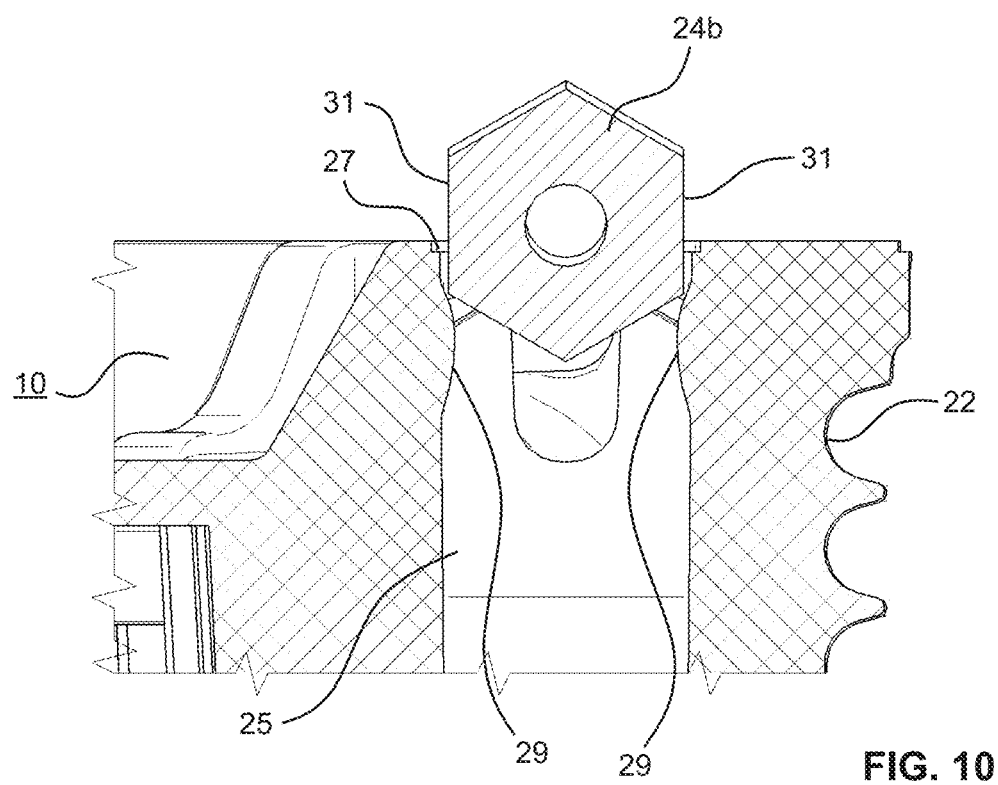
FIG. 10 is a sectional illustration taken along the line X-X shown in FIG. 9.

FIGS. 9 and 10 show a further variant or possibility of inserting the cable nipple 24b into the nipple chamber 25. The cable nipple 24b here is inserted into the nipple chamber 25 having the nipple longitudinal axis $N_L$ running transversely to the drum rotation axis D or orientated in the tangential direction, respectively. The cable nipple 24b here is press-fitted over the respective delimiting element 29 such that the cable nipple 24b is pushed axially over the delimiting element 29.

Figure 11:
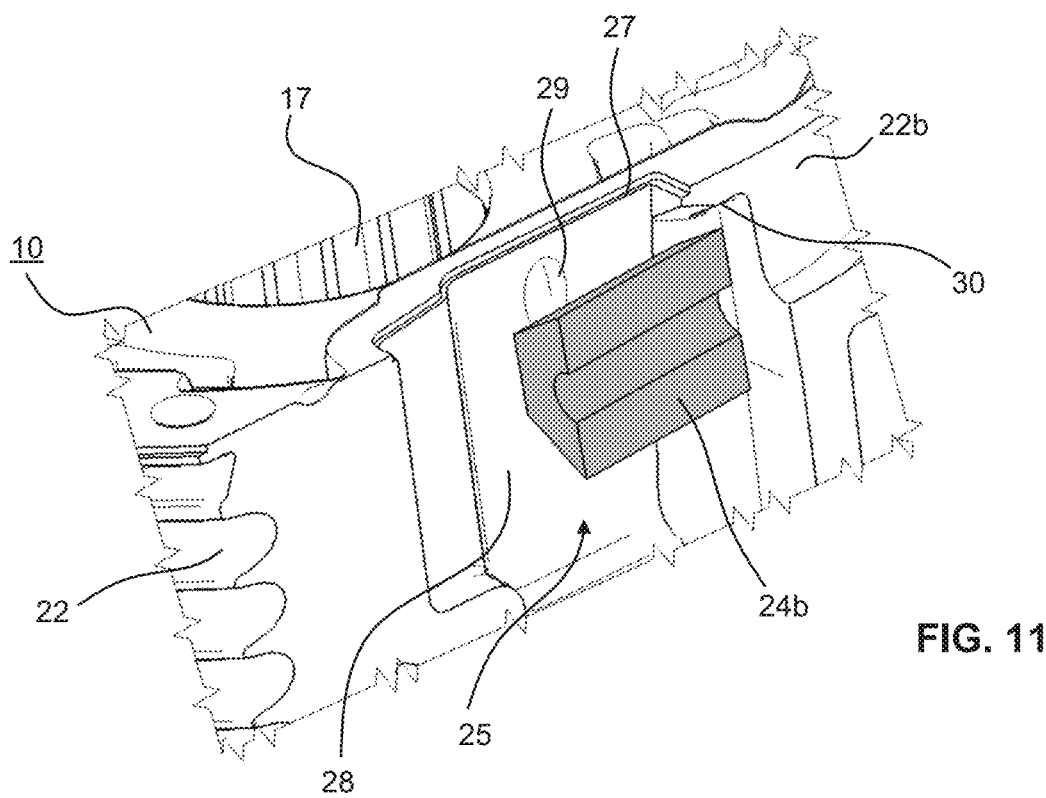
FIG. 11 is a perspective sectional illustration showing the cable nipple in the position thereof axially below the delimiting element within the nipple chamber, with the nipple longitudinal axis being (axially) oriented in the tangential direction.
Figure 12:
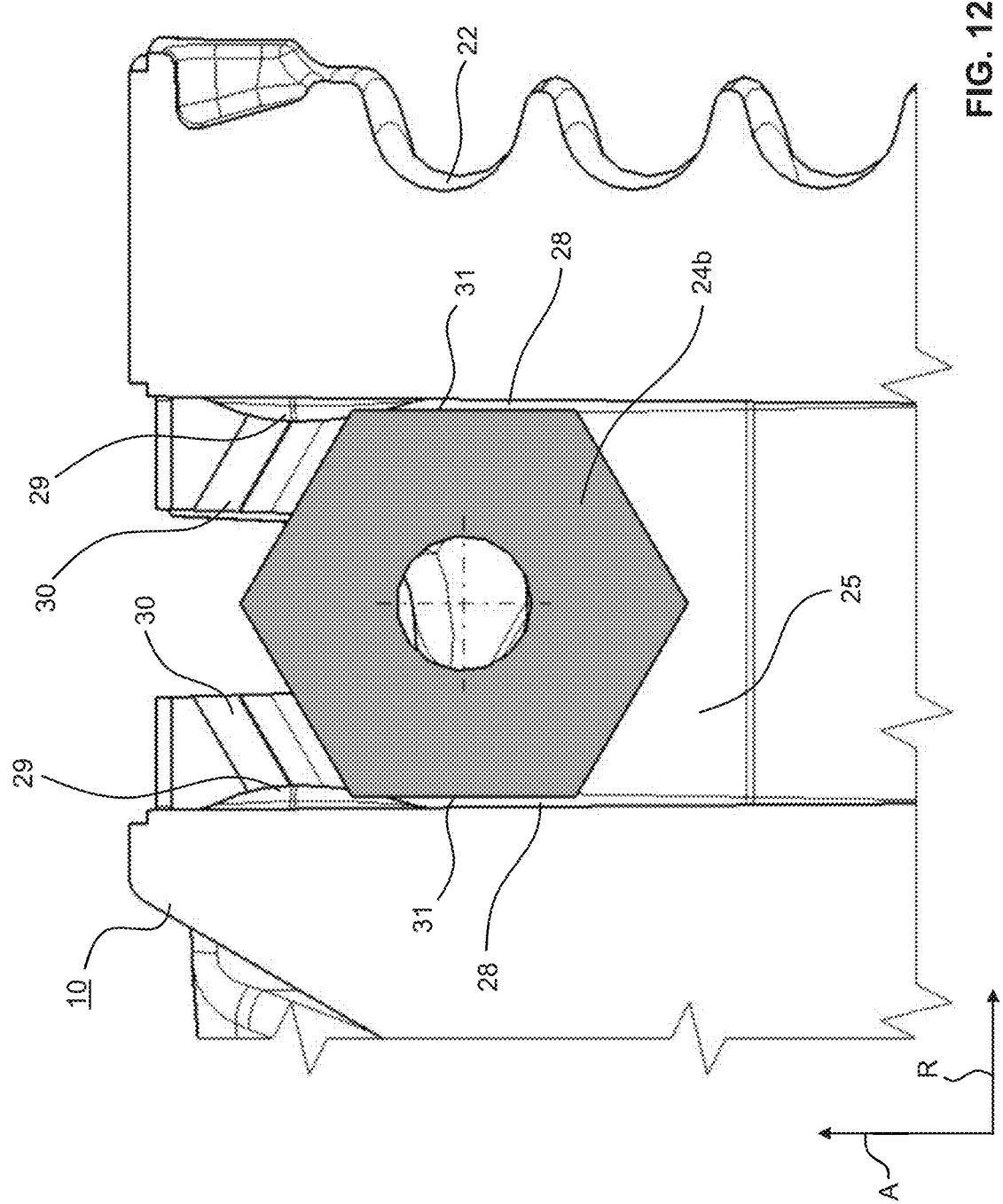
FIG. 12 is a sectional illustration according to FIG. 10 showing the installed situation according to FIG. 11.

FIGS. 11 and 12 show the assembled state of the cable nipple 24b in the nipple chamber 25, in which the cable nipple 24b within the nipple chamber 25 has assumed an intended position or orientation axially below the delimiting element 29, for example already at the transition to the groove portion (channel end) 22b. The cable nipple 24b in the final assembled position by way of a nipple longitudinal portion is disposed below the rear-engagement contour 30 and fixed in the nipple chamber 25, in particular also by virtue of the tensile force of the spring element 21 acting on the traction cable 5.

In the assembly of the traction cable 5, the cable nipple 24a thereof, for example at the incoming cable end, is first inserted into the assigned nipple chamber 23. It is avoided here by virtue of the delimiting element 29, or the two or the plurality of delimiting elements 29, that the cable nipple 24a slides out of the nipple chamber 23. Once the cable nipple 24a has been guided into the nominal position thereof within the nipple chamber 23, the traction cable 5, by way of a number of axially spaced apart windings, while forming the incoming cable portion 5a and the outgoing cable portion 5b that is axially spaced apart from the latter, is placed into the cable groove 22 on the casing or the circumference of the cable drum 10, and the traction cable 5 is wound onto the cable drum 10. Once the traction cable 5 has been guided over the deflection elements or deflection rollers 6, 7 and been connected to the or each rail slider 3, the second cable nipple 24b at the remaining cable end is inserted into the second nipple chamber 25 and fixed therein in an analogous manner.

In summary, the invention relates to a cable drive device 8 of an adjustment system 1 of a motor vehicle, having an actuating drive 11 and a cable drive housing 9 in which a cable drum 10 that is rotatably coupled to the actuating drive 11 and has a traction cable 5 wound thereon is received, wherein the cable drum 10, for receiving a cable nipple 24a, 24b fastened to the traction cable 5, on at least one end side 10b, 10c has a nipple chamber 23, 25 having a chamber opening 27 and mutually spaced apart chamber walls 28, and wherein the nipple chamber 23, 25 on at least one of the chamber walls 28 has a delimiting element 29, the cable nipple 24a, 24b when introduced or inserted into the nipple chamber 23, 25 engaging below said delimiting element 29.

The cable drum 10, which also represents an independent invention, has a drum casing 10a having a helical or spiral cable groove 22 and on at least one drum end side 10b, 10c a nipple chamber 23, 25 having a chamber opening 27 as well as mutually spaced apart chamber walls 28, wherein within the nipple chamber 23, 25, in particular in the region of the chamber opening 27 thereof, an in particular oval or teardrop-shaped delimiting element 29 that is oriented in the direction of the opposite chamber wall 28 is provided on at least one of the chamber walls 28, in particular molded on the chamber wall 28.

The claimed invention is not restricted to the exemplary embodiment described above. Rather, other variants of the invention may also be derived therefrom by a person skilled in the art within the scope of the disclosed claims without departing from the subject matter of the claimed invention. In particular, all of the individual features described in connection with the various exemplary embodiments may further also be combined in other ways within the scope of the disclosed claims without departing from the subject matter of the claimed invention.

Moreover, the solution described cannot only be used in the specially illustrated specific application, but also in a similar embodiment in other motor vehicle applications such as, for example, in door and tailgate systems, in single-wire window lifters, in vehicle locks, in adjustable seat and interior systems, as well as in electric drives, control systems, sensors and the disposal thereof in the vehicle.

The following is a summary list of reference numerals and the corresponding structure used in the above description of the invention:

1 Window lifter
2 Guide rail
3 Rail slider
4 Window glass
5 Traction cable/inner cable
5a Incoming cable portion
5b Outgoing cable portion
6 Upper deflection element/upper deflection roller
7 Lower deflection element/lower deflection roller
8 Cable drive device
9 Cable drive housing
10 Cable drum
10a Drum casing
10b First drum end side
10c Second drum end side
11 Actuating drive
12 Electric motor
13 Gearbox housing
14 Pivot
15 External toothing
16 Receptacle opening
18 Internal toothing
19 Housing wall
19a Incoming cable duct
19b Outgoing cable duct
20 Traction casing
21 Spring element
22 Cable groove
22a First groove portion/channel end
22b Second groove portion/channel end
22c (Upper) groove portion
23 First nipple chamber
24a First cable nipple
24b Second cable nipple
25 Second nipple chamber
26 Central drum opening
27 Chamber opening
28 Chamber wall
29 Delimiting element
30 Rear-engagement contour
31 Nipple face
A Axial direction
D Rotation axis
$L_N$ Chamber length/extent
$L_S$ Nipple length
$L_{T1}$ Length of the (left) chamber region
$L_{T2}$ Length of the (right) chamber region
$N_L$ Nipple longitudinal axis
R Radial direction
T Tangential direction
U Circumferential direction
d Nipple width/external dimension
w Available width

The invention claimed is:

1. A cable drive device of an adjustment system, the cable drive device comprising:
   an actuating drive;
   a cable drive housing;
   a cable drum disposed in said cable drive housing and coupled to said actuating drive and rotatable about a rotation axis and onto said cable drum a traction cable is to be wound, wherein said cable drum for receiving the traction cable containing a drum casing having a helical or spiral cable groove formed therein and said helical or spiral cable groove on at least one end side of said cable drum opens into a nipple chamber for receiving a cable nipple fastened to an end side of the traction cable, wherein:
   said nipple chamber having a chamber opening formed therein as well as chamber walls running in an axial direction and being mutually spaced apart in a radial direction; and
   said nipple chamber on at least one of said chamber walls having a delimiting element, said delimiting element in a region of said chamber opening in a tangential direction subdividing said nipple chamber into two chamber regions of which a tangential extent is smaller than a length of the cable nipple, the cable nipple when introduced into said nipple chamber by way of said chamber opening engaging below said delimiting element, an available width between said chamber walls in a region of said delimiting element being smaller than a diameter or than a spacing between opposite nipple faces of said cable nipple.

2. The cable drive device according to claim 1, wherein:
   said delimiting element is embodied as a rib; and/or
   said delimiting element is oval or teardrop-shaped and in the axial direction tapers toward a drum end side opposite said chamber opening.

3. The cable drive device according to claim 2, wherein said rib extends in the axial direction so as to be radially raised on said chamber wall.

4. The cable drive device according to claim 1, wherein said delimiting element is one of a plurality of delimiting elements, at least one of said delimiting elements is provided on each of two said chamber walls of said nipple chamber.

5. The cable drive device according to claim 4, wherein said delimiting elements in the radial direction are disposed so as to be diametrically opposite one another.

6. The cable drive device according to claim 1, wherein:
   the cable nipple in cross section is polygonal shaped; and/or
   said delimiting element is molded in one of said chamber walls or molded from one of chamber walls.

7. The cable drive device according to claim 6, wherein the cable nipple in cross section is hexagonal shaped.

8. The cable drive device according to claim 1, wherein said cable drum has a central receptacle opening having a joining contour for establishing a form-fitting joint with a mating contour of said actuating drive.

9. The cable drive device according to claim 1, wherein said cable drum having a drum-proximal rear-engagement contour at a transition from said helical or spiral cable groove to said nipple chamber, the cable nipple in an assembled state by way of a nipple portion engaging below said drum-proximal rear-engagement contour.

10. The cable drive device according to claim 1, wherein the adjustment system is a window lifter of a motor vehicle.

11. The cable drive device according to claim 1, wherein:
said actuating drive has a pivot with an external toothing; and
said cable drum has a central receptacle opening having an internal toothing, for establishing a form-fitting joint with said external toothing of said pivot of said actuating drive.

12. A window lifter as an adjustment system for a motor vehicle, the window lifter comprising:
a rail slider having an entrainment function for a window glass;
at least one guide rail on which said rail slider is movably guided; and
said cable drive device according to claim 1.

13. A cable drum, comprising:
a drum casing having a helical or spiral cable groove formed therein and at least on one drum end side a nipple chamber for receiving a cable nipple, said nipple chamber having a chamber opening formed therein as well as chamber walls that are mutually spaced apart, and within said nipple chamber, an oval or teardrop-shaped delimiting element being oriented in a direction of an opposite chamber wall is disposed on at least one of said chamber walls, said delimiting element in a region of said chamber opening in a tangential direction subdividing said nipple chamber into two chamber regions of which a tangential extent is smaller than a length of the cable nipple, an available width between said chamber walls in a region of said delimiting element being smaller than a diameter or than a spacing between opposite nipple faces of said cable nipple.

14. The cable drum according to claim 13, wherein said oval or teardrop-shaped delimiting element disposed in a region of said chamber opening and said oval or teardrop-shaped delimiting element is molded on at least one of said chamber walls.

* * * * *